United States Patent [19]

Takahashi et al.

[11] Patent Number: 5,086,859

[45] Date of Patent: Feb. 11, 1992

[54] METHOD AND SYSTEM FOR CONTROLLING ELECTRIC POWER STEERING

[75] Inventors: Tsutomu Takahashi; Seiichiro Oshita; Toyohiko Mouri, all of Tokyo, Japan

[73] Assignee: Fuji Jukogyo Kabushiki Kaisha, Tokyo, Japan

[21] Appl. No.: 555,818

[22] Filed: Jul. 20, 1990

Related U.S. Application Data

[63] Continuation of Ser. No. 324,144, Mar. 9, 1989, abandoned.

[30] Foreign Application Priority Data

Mar. 15, 1988 [JP] Japan ................................. 63-61251

[51] Int. Cl.$^5$ .............................................. B62D 5/04
[52] U.S. Cl. ................................... 180/79.1; 180/142; 318/434
[58] Field of Search ..................... 180/79.1, 163, 141, 180/142; 361/31; 318/434

[56] References Cited

U.S. PATENT DOCUMENTS

| | | | |
|---|---|---|---|
| 4,591,014 | 5/1986 | Yasuda | 180/79.1 |
| 4,727,950 | 3/1988 | Shimizu et al. | 180/79.1 |
| 4,756,375 | 7/1988 | Ishikura et al. | 180/79.1 |

*Primary Examiner*—Mitchell J. Hill
*Attorney, Agent, or Firm*—Beveridge, DeGrandi & Weilacher

[57] ABSTRACT

An electric power steering device in which current supplied to an electric motor is controlled in dependence on the torsional torque transmitted through the steering wheel shaft. And power steering is assisted by the rotation of the motor. The method comprises the steps of presetting a steering angle which is in the vicinity of the maximum steering angle and is less by a specific angle than the maximum steering angle; establishing the motor current value determined in dependence on the torsional torque at the time when the actual steering angle reaches the steering angle which is preset as the motor current limiting value at that time; and controlling the power steering device to assist steering by the motor current limiting value even though the torsional torque increases.

8 Claims, 2 Drawing Sheets

METHOD AND SYSTEM FOR CONTROLLING ELECTRIC POWER STEERING

This application is a continuation of application Ser. No. 07/324,144, filed Mar. 9, 1989, now abandoned.

BACKGROUND OF THE INVENTION

The present invention relates to power steering means of vehicles and more particularly to a method and system for controlling a power steering device of electrically-driven type of a vehicle.

As is known, a power steering device of a vehicle which is steered by turning a steering wheel operates in accordance with the torque transmitted through the steering shaft to generate assist power for steering manipulation. In the known power steering devices the most widely used are those of the oil pressure (hydraulic) type (as described, for example, in Japanese Utility Model Laid-Open Publn. No. 44181/1978) and those of the electrically-driven type (as described, for example, in Japanese Patent Laid-Open Publn. No. 1808/1974).

In a steering system provided with a power steering device as mentioned above, the power steering device generates an excessively large assist torque in dependence on the excessive steering torque and is subjected to larger load than necessary. This is carried out in the case where the steering wheel is turned fully in one direction to strike against a stop mechanism and thereafter is held in place by the application thereto of additional force.

SUMMARY OF THE INVENTION

It is an object of the present invention to provide a method of controlling an electric power steering device in a vehicle. In the method a limiting value of the armature current (of an electric motor for supplying the steering assist power) in the vicinity of the maximum steering angle is preset according to various conditions such as the coefficient of friction of the road surface and the gross weight of the vehicle. Thus, the flow of excessive current is prevented when the steering wheel rotation is stopped by a stop mechanism.

In another aspect of the invention, it is an object thereof to provide means for practicing the method of the present invention.

According to the present invention in the first aspect thereof, there is provided a method for controlling a power steering device of electrically-driven type in which current supplied to an electric motor is controlled in accordance with the torsional torque transmitted through the steering wheel shaft. And power assist in a steering direction is accomplished by the rotation of the motor. The method comprises the steps of presetting a steering angle which is in the vicinity of the maximum steering angle and which is less by a specific angle than the maximum steering angle; establishing the motor current value determined in dependence on the steering wheel torque at the time when the actual steering angle reaches the steering angle which is preset as the motor current limiting value at that time; and controlling the power steering device to carry out power assist in the steering direction at the motor current limiting value even though the steering wheel shaft torque increases further.

According to the present invention, in another aspect thereof, there is provided a system for controlling a power steering device of electrically-driven type in which current supplied to an electric motor is controlled in dependence on the torsional torque transmitted through the steering wheel shaft. And power assist in a steering direction is accomplished by the rotation of the motor. The system comprises means for presetting a steering angle which is in the vicinity of the maximum steering angle and which is less by a specific angle than the maximum steering angle; means for establishing the motor current value determined in dependence on the steering wheel torque at the time when the actual steering angle reaches the steering angle which is preset as the motor current limiting value at that time; and means for controlling said power steering device to assist the steering at the motor current limiting value even though the steering wheel shaft torque increases further.

As summarized above, the limiting value of the motor current is determined by various driving conditions such as the coefficient of friction of the road surface and the gross weight of the vehicle. Accordingly, overheating of the motor and excessive discharging of the battery can be prevented while motor current values required for steering are secured.

The other objects and features of the present invention will become understood from the following detailed description referring to accompanying drawings.

DETAILED DESCRIPTION OF THE PREFERRED EMBODIMENTS

Figure 1:
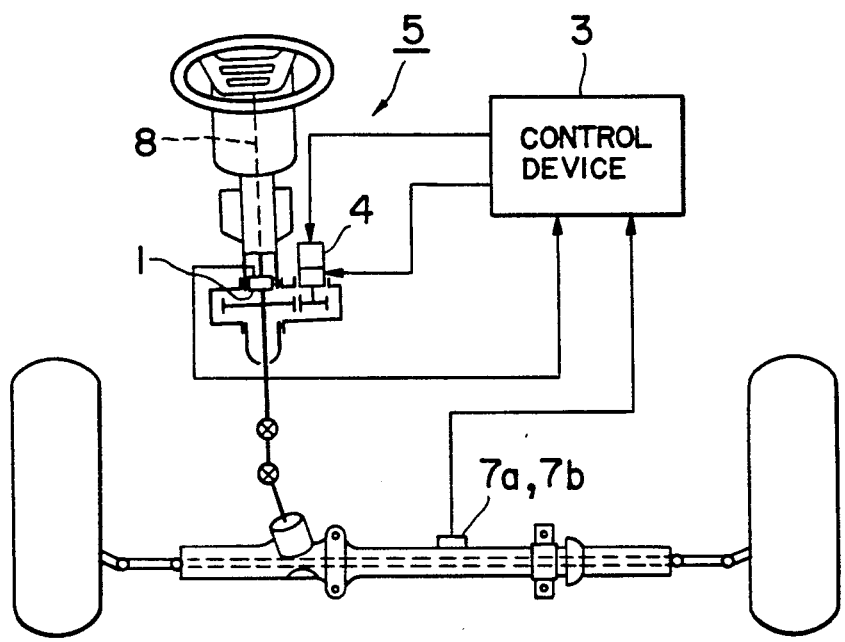
FIG. 1 is a schematic view showing a power steering system according to the present invention.
Figure 2:
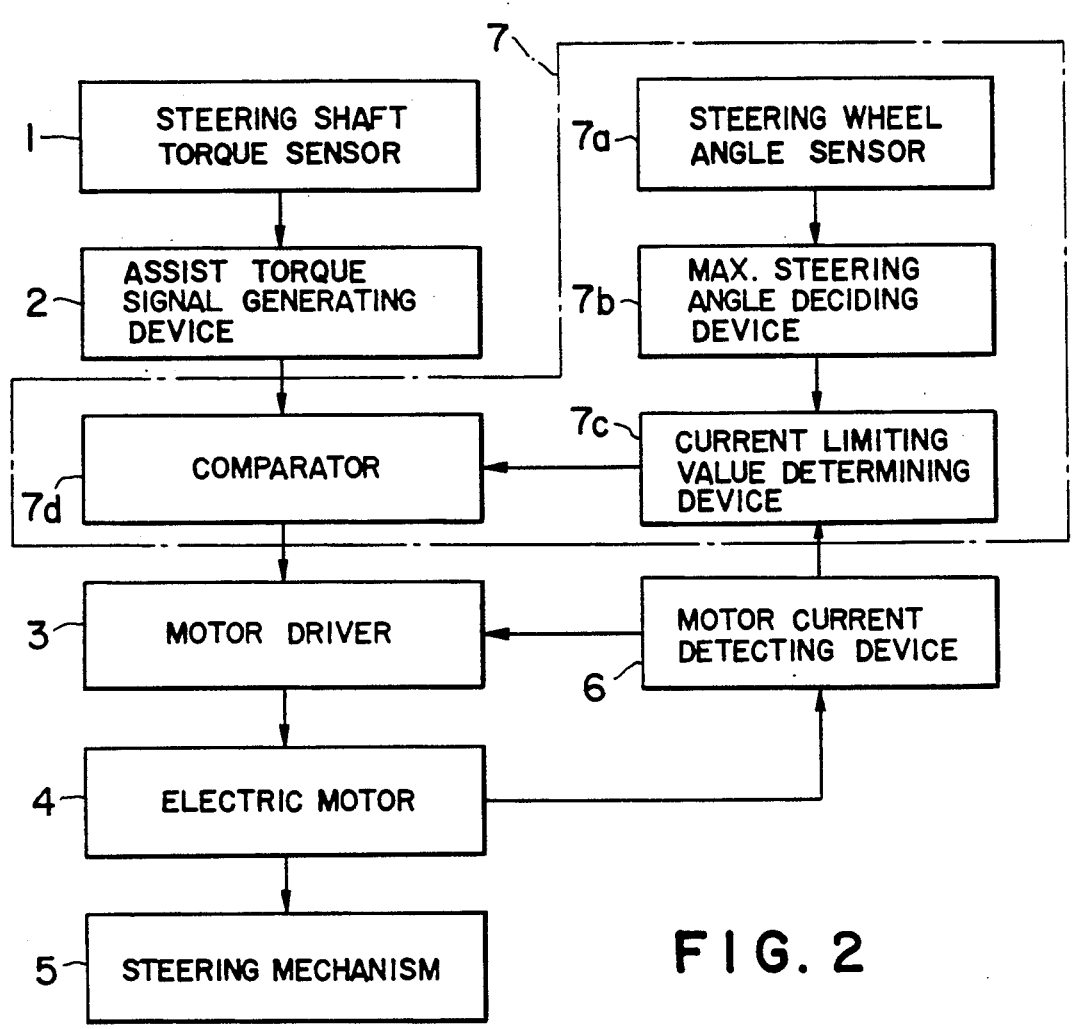
FIG. 2 is a block diagram indicating one embodiment of this invention.

Referring to FIGS. 1 and 2, the steering system of an automotive vehicle in which this invention is applied is provided with a steering shaft torque sensor 1 for detecting torsional torque transmitted through the steering shaft 8 and for generating a torque signal proportional to this shaft torque; an assist torque signal generating device 2 in response to this torque signal for generating a motor current command value; a motor driver 3 operating in dependence on the motor current command value to drive an electric motor 4 to supply assist power to the steering mechanism 5 of the steering system; and a motor current detecting device 6 for detecting an actual current. And the motor driver 3 as controlling device compares the motor current command value with the actual motor current and then carries out feedback control.

According to the present invention, system protective means 7 is provided in combination with the above described components of the steering system and comprises the following devices.

Figure 3:
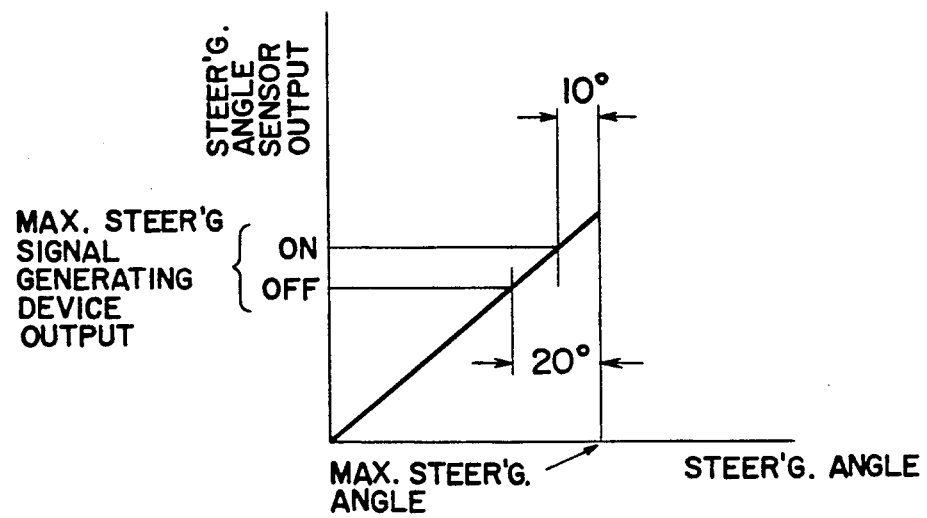
FIG. 3 is a graph indicating the relationship between steering angle and the output signal of a maximum steering angle deciding device.

A steering wheel angle sensor 7a is provided for detecting the angle of turn of the steering wheel and for transmitting the detected angle to a maximum steering angle deciding device 7b. The device 7b generates an output signal when the steering angle becomes a value equal to or exceeding a higher predetermined angle. The high predetermined angle is less than a maximum steering angle by a specific angle, for example, by 10 degrees. And the output signal becomes off when the detected steering angle becomes a lower predetermined value than the maximum steering angle, for example, by 20 degrees, as indicated in FIG. 3. A current limiting value determining device 7c operates, upon receiving the output signal from the maximum steering angle deciding device 7b, to store the motor current command value detected by the motor current detecting device 6. And the device 7c produces a motor current limiting value until the output signal from the device 7b is turned off. The motor current limiting value is transmitted to the comparator 7d provided between the assist torque signal generating device 2 and motor driver 3. And then the motor current command value outputted from the device 2 and the motor current limiting value outputted from the current limiting value determining device 7c are compared by the comparator 7d. The comparator 7d selects the lower value and the lower value is transmitted to the motor driver 3.

According to the present invention, the motor current value determined in dependence on the magnitude of the steering shaft torque signal from the steering shaft torque sensor 1 is applied as the motor current limiting value at the time when the steering wheel angle reaches the vicinity of its maximum rotational angle. The motor current value is also applied as the motor current limiting value where the steering wheel is turned to the maximum angle of rotation and stopped by a stop mechanism, and a steering force is further applied to hold the steered state. For this reason, the motor current limiting value becomes a predetermined value in dependence on various conditions such as the friction coefficient of the road surface and gross weight of the vehicle. Thus, the system protective means prevents overheating of various system elements, e.g., transistors that are the elements of the motor 4 and the motor driver 3 and prevents excessive discharging of the battery. At the same time, deterioration of the battery can be effectively prevented. Therefore, necessary motor current for steering is positively secured.

Furthermore, within the ordinary steering range in which the steering angle does not reach the vicinity of the maximum steering angle, a motor current limiting value is not applied. Therefore, unnecessary power assist cannot be applied.

While the presently preferred embodiment of the present invention has been shown and described, it is to be understood that this disclosure is for the purpose of illustration and that various changes and modifications such as fork lifts and other industrial vehicles may be made without departing from the scope of the invention as set forth in the appended claims.

What is claimed is:

1. A controlling system for controlling an electric power steering device mounted on a vehicle, having a steering wheel operatively connected to wheels to be steered through a steering shaft, an electric motor for assisting the rotation of the steering wheel, torsion torque sensing means for producing a torsion torque signal indicative of torsion torque on the steering shaft, assist torque signal generating means responsive to said torsion torque signal for generating a desired motor current command signal, and motor signal, and motor driver means responsive to current command signal, and motor driver means responsive to said desired motor current command signal for operating said electric motor, the system comprising:

motor current detecting means for detecting an actual motor current flowing to the electric motor and for producing an actual motor current signal indicative thereof;

steering wheel angle detecting means for detecting a turning angle of the steering wheel and for producing a steering angle signal indicative thereof;

maximum steering angle deciding means responsive to said steering angle signal for deciding a condition when said steering angle becomes equal to or over a first predetermined value and for generating an output indicative thereof;

current limiting value determining means for storing said actual motor current signal as a motor current limiting value when said condition is satisfied and for producing a motor current limiting signal indicative thereof; and comparator means for comparing said motor current limiting signal and said desired motor current command signal to operate the electric motor by said motor current limiting value when said desired current signal is greater than said current limiting signal, so as to prevent overheating of various element of said electric power steering device.

2. A controlling system according to claim 1, wherein said first predetermined value is less by a specific angle than a maximum steering angle.

3. A controlling system according to claim 2, wherein said specific angle is 10 degrees.

4. A controlling system according to claim 2, wherein said maximum steering angle deciding means includes a second predetermined value for turning off the generation of said motor current limiting signal when a value of said steering angle signal becomes a second predetermined value.

5. A controlling system according to claim 4, wherein said second predetermined value is less by a preset angle than the first predetermined value.

6. A controlling system according to claim 4, wherein said preset angle is 20 degrees.

7. A controlling system according to claim 1, wherein said motor driver means carries out a feedback control by comparing said actual motor current signal with one of said motor current limiting signal and said desired motor current command signal.

8. A method for controlling an electric power steering device mounted on a vehicle, having a steering wheel operatively connected to wheels to be steered through a steering shaft, an electric motor for assisting the rotation of the steering wheel, the method comprising:

producing a torsion torque signal indicative of torsion torque on the steering shaft;

generating a desired motor current command signal in response to said torsion torque signal;

detecting an actual motor current flowing to the electric motor to produce an actual motor current signal indicative thereof;

detecting a turning angle of the steering wheel to produce a steering angle signal indicative thereof;

deciding a condition that said steering angle becomes equal to or over a first predetermined value;

storing a value of said actual motor current signal as a motor current limiting value when said condition is satisfied and producing a motor current limiting signal indicative thereof; and comparing said motor current limiting signal with said desired motor command signal and producing said motor current limiting signal to operate the electric motor when said desired current signal is greater than said current limiting signal, so as to prevent overheating of various element of said electric power steering device.

* * * * *